United States Patent
Datla et al.

(10) Patent No.: US 10,200,299 B2
(45) Date of Patent: *Feb. 5, 2019

(54) METHOD AND SYSTEM FOR DIRECTING USER BETWEEN CAPTIVE AND OPEN DOMAINS

(71) Applicant: Comcast Cable Communications, LLC, Philadelphia, PA (US)

(72) Inventors: Raju Datla, Cherry Hill, NJ (US); Srini Avirneni, Chester Springs, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/461,015

(22) Filed: Mar. 16, 2017

(65) Prior Publication Data

US 2017/0353393 A1    Dec. 7, 2017

Related U.S. Application Data

(63) Continuation of application No. 14/051,025, filed on Oct. 10, 2013, now Pat. No. 9,654,412, which is a (Continued)

(51) Int. Cl.
  *H04L 29/06* (2006.01)
  *H04L 12/911* (2013.01)
  *H04L 29/08* (2006.01)

(52) U.S. Cl.
  CPC ............. *H04L 47/70* (2013.01); *H04L 63/10* (2013.01); *H04L 67/289* (2013.01); *H04L 67/2814* (2013.01)

(58) Field of Classification Search
  None
  See application file for complete search history.

(56) References Cited

U.S. PATENT DOCUMENTS 5,440,632 A    8/1995 Bacon et al.
5,666,293 A    9/1997 Metz et al.
(Continued)

FOREIGN PATENT DOCUMENTS

WO    2005079000 A1    8/2005

OTHER PUBLICATIONS

U.S. Appl. No. 13/429,962, Method of Initializing Provisioning and Managing a Cable Modem and a Customer Premise Equipment Device, filed Mar. 26, 2012.
(Continued)

*Primary Examiner* — Shin-Hon (Eric) Chen
(74) *Attorney, Agent, or Firm* — Banner & Witcoff, Ltd.

(57) ABSTRACT

Systems, apparatuses, and methods are described for directing users to captive and open domains. The captive domain may include electronically accessible content provided by a service provider and the open domain may include electronically accessible content that is not completely provided by the service provider. A captive domain server may permit communications from a user device to the captive domain and block communications from the user device to the open domain. The captive domain server may forward, subsequent to the permitting, new communications from the user device to the open domain.

40 Claims, 2 Drawing Sheets

Related U.S. Application Data continuation of application No. 13/336,672, filed on Dec. 23, 2011, now Pat. No. 8,601,545, which is a continuation of application No. 11/933,669, filed on Nov. 1, 2007, now Pat. No. 8,108,911.

(56) References Cited

U.S. PATENT DOCUMENTS

| | | | |
|---|---|---|---|
| 5,845,077 | A | 12/1998 | Fawcett |
| 6,023,464 | A | 2/2000 | Woundy |
| 6,308,289 | B1 | 10/2001 | Ahrens et al. |
| 6,351,773 | B1 | 2/2002 | Fijolek et al. |
| 6,393,585 | B1 | 5/2002 | Houha et al. |
| 6,501,750 | B1 | 12/2002 | Shaffer et al. |
| 6,529,910 | B1 | 3/2003 | Fleskes |
| 6,553,568 | B1 | 4/2003 | Fijolek et al. |
| 6,560,203 | B1 | 5/2003 | Beser et al. |
| 6,570,855 | B1 | 5/2003 | Kung et al. |
| 6,574,796 | B1 | 6/2003 | Roeck et al. |
| 6,577,642 | B1 | 6/2003 | Fijolek et al. |
| 6,636,485 | B1 | 10/2003 | Fijolek et al. |
| 6,654,387 | B1 | 11/2003 | Beser et al. |
| 6,658,000 | B1 | 12/2003 | Raciborski et al. |
| 6,690,655 | B1 | 2/2004 | Miner et al. |
| 6,693,878 | B1 | 2/2004 | Daruwalla et al. |
| 6,715,075 | B1 | 3/2004 | Loukianov |
| 6,751,299 | B1 | 6/2004 | Brown et al. |
| 6,768,722 | B1 | 7/2004 | Katseff et al. |
| 6,768,743 | B1 | 7/2004 | Borella et al. |
| 6,822,955 | B1 | 11/2004 | Brothers et al. |
| 6,831,921 | B2 | 12/2004 | Higgins |
| 6,836,806 | B1 | 12/2004 | Raciborski et al. |
| 6,857,009 | B1 | 2/2005 | Ferreria et al. |
| 6,865,613 | B1 | 3/2005 | Millet et al. |
| 6,904,460 | B1 | 6/2005 | Raciborski et al. |
| 6,917,675 | B2 | 7/2005 | Lazarus et al. |
| 6,952,428 | B1 | 10/2005 | Necka et al. |
| 7,007,080 | B2 | 2/2006 | Wilson |
| 7,035,270 | B2 | 4/2006 | Moore, Jr. et al. |
| 7,039,432 | B2 | 5/2006 | Stater et al. |
| 7,058,055 | B2 | 6/2006 | Mugica et al. |
| 7,065,047 | B2 | 6/2006 | Boxall et al. |
| 7,085,814 | B1 | 8/2006 | Gandhi et al. |
| 7,120,139 | B1 | 10/2006 | Kung et al. |
| 7,127,049 | B2 | 10/2006 | Godse et al. |
| 7,158,543 | B1 | 1/2007 | Garakani et al. |
| 7,213,062 | B1 | 5/2007 | Raciborski et al. |
| 7,272,846 | B2 | 9/2007 | Williams et al. |
| 7,285,090 | B2 | 10/2007 | Stivoric et al. |
| 7,293,078 | B2 | 11/2007 | Danforth |
| 7,293,282 | B2 | 11/2007 | Danforth et al. |
| 7,308,700 | B1 | 12/2007 | Fung et al. |
| 7,334,258 | B1 | 2/2008 | Ford et al. |
| 7,337,217 | B2 | 2/2008 | Wang |
| 7,353,021 | B2 | 4/2008 | Ejzak et al. |
| 7,356,841 | B2 | 4/2008 | Wilson et al. |
| 7,372,809 | B2 | 5/2008 | Chen et al. |
| 7,373,660 | B1 | 5/2008 | Guichard et al. |
| 7,415,603 | B2 | 8/2008 | Woundy et al. |
| 7,443,883 | B2 | 10/2008 | Seiden |
| 7,467,214 | B2 | 12/2008 | Chin |
| 7,484,234 | B1 | 1/2009 | Heaton et al. |
| 7,496,485 | B2 | 2/2009 | Elfadel et al. |
| 7,496,652 | B2 | 2/2009 | Pezzutti |
| 7,502,841 | B2 | 3/2009 | Small et al. |
| 7,512,969 | B2 | 3/2009 | Gould et al. |
| 7,526,538 | B2 | 4/2009 | Wilson |
| 7,539,193 | B2 | 5/2009 | Pfeffer et al. |
| 7,568,220 | B2 | 7/2009 | Burshan |
| 7,600,003 | B1 | 10/2009 | Okmianski et al. |
| 7,609,619 | B2 | 10/2009 | Naseh et al. |
| 7,617,517 | B2 | 11/2009 | Kay |
| 7,647,617 | B2 | 1/2010 | Bartleld et al. |
| 7,693,171 | B2 | 4/2010 | Gould |
| 7,710,865 | B2 | 5/2010 | Naseh et al. |
| 7,747,772 | B2 | 6/2010 | Raciborski et al. |
| 7,769,886 | B2 | 8/2010 | Naseh et al. |
| 7,836,092 | B2 | 11/2010 | Alaniz et al. |
| 7,839,870 | B2 | 11/2010 | Siripunkaw et al. |
| 7,848,234 | B2 | 12/2010 | McKinnon, III et al. |
| 7,881,225 | B2 | 2/2011 | Siripunkaw et al. |
| 8,015,271 | B2 | 9/2011 | McKeown et al. |
| 8,041,824 | B1* | 10/2011 | Maeng ............... H04L 63/10 709/229 |
| 8,042,132 | B2 | 10/2011 | Carney et al. |
| 8,050,194 | B2 | 11/2011 | Siripunkaw et al. |
| 8,108,911 | B2 | 1/2012 | Datla et al. |
| 8,493,987 | B2 | 7/2013 | Siripunkaw et al. |
| 8,914,522 | B2 | 12/2014 | Rao et al. |
| 2001/0038690 | A1 | 11/2001 | Palmer et al. |
| 2001/0049732 | A1 | 12/2001 | Raciborski et al. |
| 2001/0051980 | A1 | 12/2001 | Raciborski et al. |
| 2001/0053159 | A1 | 12/2001 | Bunn et al. |
| 2002/0010865 | A1 | 1/2002 | Fulton et al. |
| 2002/0013948 | A1 | 1/2002 | Aguayo et al. |
| 2002/0042819 | A1 | 4/2002 | Reichert et al. |
| 2002/0061012 | A1 | 5/2002 | Thi et al. |
| 2002/0066033 | A1* | 5/2002 | Dobbins ............ G06Q 30/0277 726/4 |
| 2002/0103931 | A1 | 8/2002 | Mott |
| 2002/0106017 | A1 | 8/2002 | Dombkowski et al. |
| 2002/0116721 | A1 | 8/2002 | Dobes et al. |
| 2002/0147819 | A1 | 10/2002 | Miyakoshi et al. |
| 2002/0152384 | A1 | 10/2002 | Shelest et al. |
| 2003/0014764 | A1 | 1/2003 | Saladino et al. |
| 2003/0069965 | A1 | 4/2003 | Ma et al. |
| 2003/0076848 | A1 | 4/2003 | Bremler-Barr et al. |
| 2003/0106067 | A1 | 6/2003 | Hoskins et al. |
| 2003/0145075 | A1 | 7/2003 | Weaver et al. |
| 2003/0200548 | A1 | 10/2003 | Baran et al. |
| 2004/0024912 | A1 | 2/2004 | Fukao et al. |
| 2004/0037316 | A1 | 2/2004 | Choi et al. |
| 2004/0048609 | A1 | 3/2004 | Kosaka |
| 2004/0095923 | A1 | 5/2004 | Ejzak et al. |
| 2004/0103308 | A1 | 5/2004 | Paller |
| 2004/0153665 | A1* | 8/2004 | Browne ............... H04L 63/104 726/22 |
| 2004/0177133 | A1 | 9/2004 | Harrison et al. |
| 2004/0179508 | A1 | 9/2004 | Thubert et al. |
| 2004/0179539 | A1 | 9/2004 | Takeda et al. |
| 2004/0190699 | A1 | 9/2004 | Doherty et al. |
| 2004/0213278 | A1 | 10/2004 | Pullen et al. |
| 2004/0226051 | A1 | 11/2004 | Carney et al. |
| 2005/0005154 | A1 | 1/2005 | Danforth et al. |
| 2005/0034115 | A1 | 2/2005 | Carter et al. |
| 2005/0047442 | A1 | 3/2005 | Volpe et al. |
| 2005/0055595 | A1 | 3/2005 | Frazer et al. |
| 2005/0055708 | A1 | 3/2005 | Gould et al. |
| 2005/0060749 | A1 | 3/2005 | Hong et al. |
| 2005/0078668 | A1* | 4/2005 | Wittenberg ......... H04L 12/2856 370/389 |
| 2005/0078688 | A1 | 4/2005 | Sharma et al. |
| 2005/0122976 | A1 | 6/2005 | Poli et al. |
| 2005/0123001 | A1 | 6/2005 | Craven et al. |
| 2005/0204168 | A1 | 9/2005 | Johnston et al. |
| 2005/0232304 | A1 | 10/2005 | Quigley |
| 2005/0233742 | A1 | 10/2005 | Karaoguz et al. |
| 2005/0246757 | A1 | 11/2005 | Relan et al. |
| 2006/0031436 | A1 | 2/2006 | Sakata et al. |
| 2006/0031921 | A1 | 2/2006 | Danforth et al. |
| 2006/0059092 | A1* | 3/2006 | Burshan ............... H04L 29/06 705/51 |
| 2006/0104232 | A1 | 5/2006 | Gidwani |
| 2006/0123118 | A1* | 6/2006 | Choe ............... H04L 61/2015 709/227 |
| 2006/0159100 | A1 | 7/2006 | Droms et al. |
| 2006/0173977 | A1* | 8/2006 | Ho ................... H04L 29/12009 709/220 |
| 2006/0184640 | A1 | 8/2006 | Hatch |
| 2006/0191005 | A1 | 8/2006 | Muhamed et al. |
| 2006/0206586 | A1 | 9/2006 | Ling et al. |
| 2006/0223497 | A1 | 10/2006 | Gallagher et al. |
| 2006/0256799 | A1 | 11/2006 | Eng |
| 2006/0271772 | A1 | 11/2006 | Woundy et al. |

(56) References Cited

U.S. PATENT DOCUMENTS

| | | |
|---|---|---|
| 2006/0271946 A1 | 11/2006 | Woundy et al. |
| 2006/0285544 A1 | 12/2006 | Taylor et al. |
| 2007/0011725 A1 | 1/2007 | Sahay et al. |
| 2007/0016762 A1 | 1/2007 | Ho |
| 2007/0130471 A1 | 6/2007 | Walker Pina et al. |
| 2007/0133409 A1 | 6/2007 | McKinnon et al. |
| 2007/0174471 A1 | 7/2007 | Van Rossum |
| 2007/0177526 A1 | 8/2007 | Siripunkaw et al. |
| 2007/0180484 A1 | 8/2007 | Siripunkaw et al. |
| 2007/0183363 A1 | 8/2007 | Liden |
| 2007/0183405 A1 | 8/2007 | Bennett |
| 2007/0214265 A1 | 9/2007 | Zampiello et al. |
| 2008/0034071 A1 | 2/2008 | Wilkinson et al. |
| 2008/0060064 A1* | 3/2008 | Wynn .................. H04L 63/062 726/5 |
| 2008/0189778 A1* | 8/2008 | Rowley ................ H04L 9/3213 726/9 |
| 2008/0209537 A1* | 8/2008 | Wong ..................... H04L 43/50 726/12 |
| 2008/0285544 A1 | 11/2008 | Qiu et al. |
| 2009/0005066 A1 | 1/2009 | Florkey et al. |
| 2009/0063833 A1 | 3/2009 | Ho |
| 2009/0125958 A1 | 5/2009 | Siripunkaw et al. |
| 2009/0238349 A1 | 9/2009 | Pezzutti |
| 2010/0064356 A1 | 3/2010 | Johnston et al. |
| 2010/0083362 A1 | 4/2010 | Francisco |
| 2011/0026536 A1 | 2/2011 | Siripunkaw et al. |
| 2013/0091534 A1 | 4/2013 | Gilde et al. |
| 2015/0012970 A1* | 1/2015 | Toksvig .................. G06F 21/41 726/3 |

OTHER PUBLICATIONS

U.S. Appl. No. 13/932,619, Device-to-Device Communication Among Customer Premise Equipment Devices, filed Jul. 1, 2013.
ISR issued in PCT/US08/081422, dated Dec. 23, 2008.
EP Search Report 08 84 6111, dated Feb. 7, 2011.
ISR issued in PCT/US06/45184, dated Oct. 29, 2007.
International Preliminary Report on Patentability issued in PCT/US06/45184, dated May 27, 2008.
Canadian Office Action—Canadian Application 2568740—dated Jan. 26, 2015.
Canadian Office Action—CA 2,568,741—dated Feb. 18, 2015.
Canadian Office Action, dated Mar. 26, 2015—CA 2,700,625.
Response to Canadian Office Action—CA 2,568,740—dated Jul. 13, 2015.
Response to Canadian Office Action—CA Appl. 2,568,741—submitted Aug. 18, 2015.
Canadian Office Action—CA Appl. 2,568,743—dated Apr. 2, 2015.
Response to Canadian Office Action—CA 2,700,625—dated Sep. 14, 2015.
Response to Canadian Office Action—CA 2,568,743—dated Oct. 1, 2015.
Canadian Office Action—CA Appl. 2,700,625—dated Feb. 26, 2016.
Canadian Office Action—CA 2,568,741—dated May 10, 2016.
Sep. 17, 2018—Canadian Office Action—CA 2,700,625.

* cited by examiner

METHOD AND SYSTEM FOR DIRECTING USER BETWEEN CAPTIVE AND OPEN DOMAINS

CROSS-REFERENCE TO RELATED APPLICATIONS

This application is a continuation of U.S. application Ser. No. 14/051,025, filed Oct. 10, 2013, which is a continuation of U.S. Pat. No. 8,601,545, filed Dec. 23, 2011, which is a continuation of U.S. Pat. No. 8,108,911, filed Nov. 1, 2007, the entire contents of which are incorporated herein by reference.

BACKGROUND OF THE INVENTION

1. Filed of the Invention

The present invention relates to directing a user between captive and open domains.

2. Background Art

In a service provider network such as, but not limited to, those associated with television or high speed data service providers, particularly service providers that have a large customer base, one challenge faced by the service provider is to redirect customers to customized portals. These portals can be used for any number of reasons, including allowing customers to select service-specific configurations, displaying a warning message for reminding customers to take appropriate action, and/or forcing certain customers to the portal until the forced customer takes an appropriate action.

Existing approaches and/or solutions require intercepting all the network traffic and redirecting the traffic to service-specific portals in real time. This approach can be undesirable since the intercepted traffic can impact traffic for all customers. Another approach relies on reconfiguring a modem (Cable or DSL or FTTH) to direct the customer to the desired portal. This approach may not be preferred since the reconfiguring the modem requires the modem to be rebooting the modem before the customer is allowed to leave the specific portal.

BRIEF DESCRIPTION OF THE DRAWINGS

The present invention is recited with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
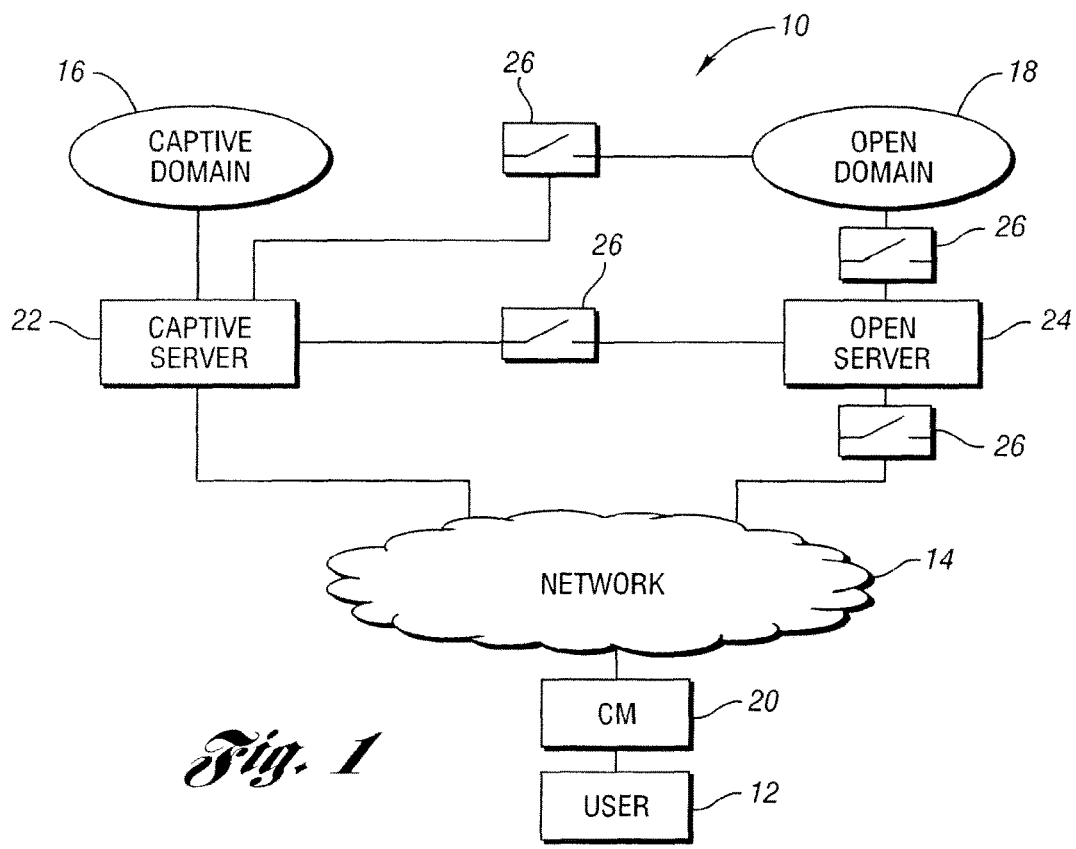
FIGS. 1-3 illustrate a system having captive and open domains in accordance with one non-limiting aspect of the present invention.

FIG. 1 illustrates a domain name system (DNS) 10 in accordance with one non-limiting aspect of the present invention. The system 10 may be associated with a television, high speed data, or other service provider (not shown) having capabilities to provide any number of services to a user 12 through signals carried over a service provider network 14. For exemplary purposes, the system is predominately described with respect to the service provider supporting high speed data-related operations. The present invention, however, is not intended to be so limited and fully contemplates its application to any number of environments besides those associated with high speed data.

The system 10 may include at least one captive domain 16 and one open domain 18. The domains 16, 18 may include servers, databases, and other sources of electronic content. These sources may be characterized as being associated with different domains 16, 18 for exemplary purpose and to emphasize different access and content restrictions associated therewith. The content of each domain, however, may be shared between the domains 16, 18, i.e., the same server may support content that is accessible through both of the domains 16, 18. The term 'domain' may be characterized as a reference address, or forced address, used to access the content therein, as described below in more detail. The term 'domain' is selected to correspond with grouping characteristics associated with the exemplary DNS protocols and architectures that may be used to control and direct access to the domains 16, 18.

The open domain 18 may be associated with the World Wide Web or other similar domain where any internet or other network user may be free to access any type of content, including content provided by entities other than the service provider or entities not under the control/approval of the service provider. The captive domain 16 may be a private domain associated with the service provider or otherwise having controlled or forced access where the same user is forced to access content specified by the service provider or otherwise authorized/controlled by the service provider (i.e., walled garden). The captive domain 16 may optionally be accessible only to devices (users) authorized by the service provider and/or devices connected to the service provider network 14.

A piece of customer premise equipment (CPE), for example a cable modem (CM) 20, may be included to facilitate user access to the service provider network 14. The cable modem 20 may be configured to receive instructions and other commands from the service provider, including instructions associated with its provisioning. This may allow the service provider to configure DNS and other attributes of the cable modem 20 associated with allowing the user to access one of 20 the domains 16, 18 through communications carried over the network 14. The attributes programmed to the cable modem 20 may be inherited by a computer or other device (not shown) connected to the cable modem 20 which the user controls to access the domains 16, 18. An ability of the service provider to individually and/or collectively provision its cable modems 20, or other equivalent device, to force user access to one of the domains 16, 18 allows the service provider to selectively control content accessible to its subscribers.

The cable modem 20 may be configured to facilitate communications with the service provider network 14 for relay to a captive server 22 and/or an open server 24 associated with the captive domain 16 and open domain 18, respectively. The servers 22, 24 may be DNS-type servers configured to facilitate access to the associated domains 16, 18. The servers 22, 24 may be configured to support any number of operations, including addressing operations associated with directing the user, or the cable modem 20 associated with the user, to specific portals/webpages associated with each domain 16, 18. The content associated with portals, web pages, etc. accessible through each domain 16, 18 may be hosted by elements associated with the domains 16, 18 and found through addresses and other instructions provided through the servers 22, 24.

FIG. 1 illustrates one configuration of the present invention where the cable modem 20 is instructed to facilitate communications with the captive server 22. The captive server 22 is further instructed to direct communications to the captive domain 16 and, optionally, to specific portals, webpages, etc. included within the captive domain 16. This arrangement may be beneficial if a need exists to force the user to access content specified by the service provider and included with the captive domain 16. For example, when the cable modem 20 is initially deployed and connected to the network 14, the service provider may restrict the cable modem 20 to access content available to through the captive domain 16, such as to provide a walled garden.

The cable modem 20, if initially restricted to accessing the walled garden, may begin an activation process where it is configured or otherwise 20 instructed to perform or support various services purchased or otherwise available to the user. During this period, the cable modem 20 and/or captive server 22 may be instructed to allow the user to access specific portals within the captive domain 16. This can be helpful in forcing the user to select desired operating parameters and to allow the service provider to make sale offers, indicate promotions, and provide other information that may be of interest to the user at a particular period of time.

Figure 2:
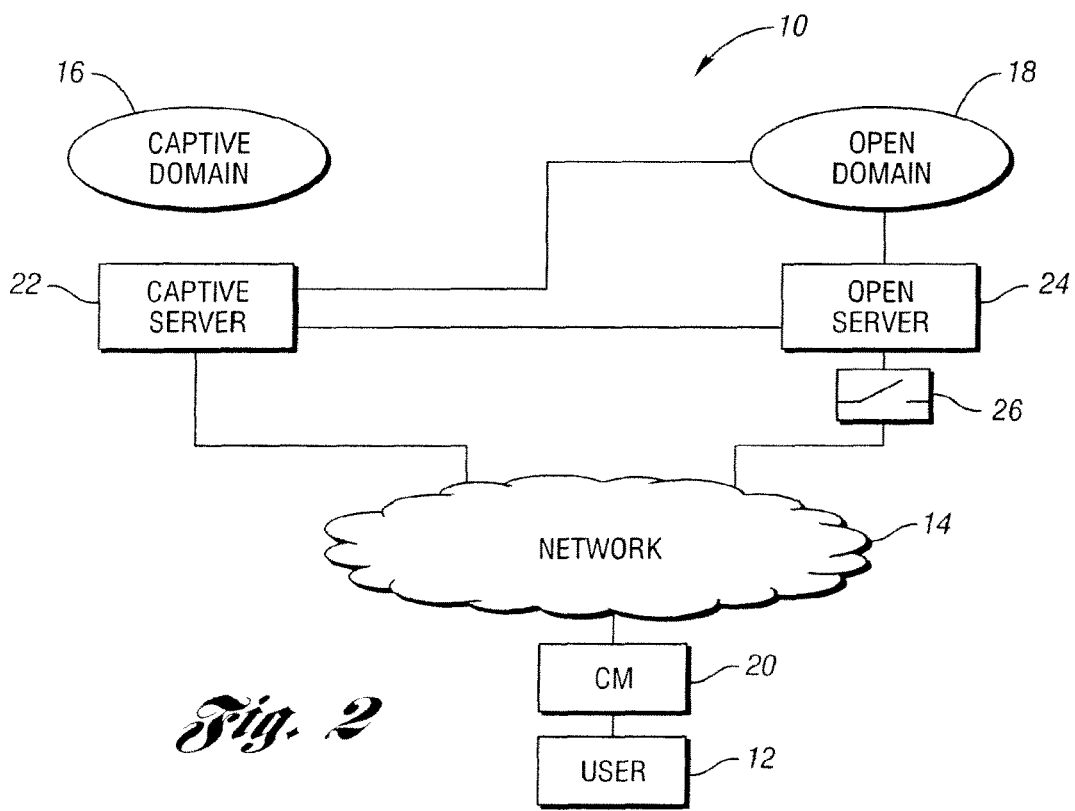

FIG. 2 illustrates the system 10 upon completion of the activation process or other event which limits access by the user the captive domain 16. The user is now able to access the open domain 18 and the content associated therewith. The access associated with FIG. 2 may require communications between the user and the open domain 18 to be routed or otherwise directed by the captive domain server 22, either through communications with the open server 24 (which may be necessary if the captive domain server 22 is unable to communicate with the open domain 18) and/or direct communications with the open domain 18. The use of the captive server 22 to facilitate access to the open domain 18 may be advantageous in allowing the user to access the open domain 18, after being restricted to the captive domain 16, without having to reboot or wait for reboot of the cable modem 20.

As one skilled in the art will appreciate, to change from one server to another, i.e., from the captive server 22 to the open server 24, the cable modem 20 may require a new configuration file, new parameter setting, or other instruction, which can only become effective once the cable modem 20 is rebooted. The present invention, at least with respect to one non-limiting aspect, contemplates its application to cable modems 20 which require reboot before new DNS attributes can be used to direct operations of the cable modem 20 and/or before they can be inherited by the device connected thereto.

The cable modem 20 may be rebooted manually through the user turning the cable modem 20 off and on and/ or through the service provider directing the cable modem 20 to turn off and on. This type of reboot can be problematic since it requires the user to experience a short interruption in services and/or to perform 20 a manual operation to the cable modem 20. Cable modems 20 or other types of CPEs may be configured by the service provider to be active on the network 14 for a pre-defined time with a renew interval defined every x number of days. The renew interval may allow for the cable modem 20 or other types of CPE to stay active on the network 14 and receive new and/or additional parameters without any 25 interruptions, or at least until expiration of the renew period when the service provider forces the cable modem 20 to reboot. This can be helpful in checking whether the cable modem 20 is still active and to update the cable modem 20 operations without a manual reboot. This type of reboot can be problematic since it requires completion of the renew period before the user is able to switch from one server to another.

The present invention allows the user to effectively switch from one server 22, 24 to another without the delays and/or interruptions mentioned above since the present invention is able to configure the captive server 22 to support operations necessary for allowing the user to access the open domain 18 prior to reboot of the cable modem 20, i.e., without requiring the cable modem 20 to directly communicate with the open server 24. Since the operations of the cable modem 20 are not, at least initially, changed when transitioning from FIG. 1 to FIG. 2, the present invention is able to allow the user to access the open domain 18 without having to reboot the cable modem 20 and without a disruption in services.

Figure 3:
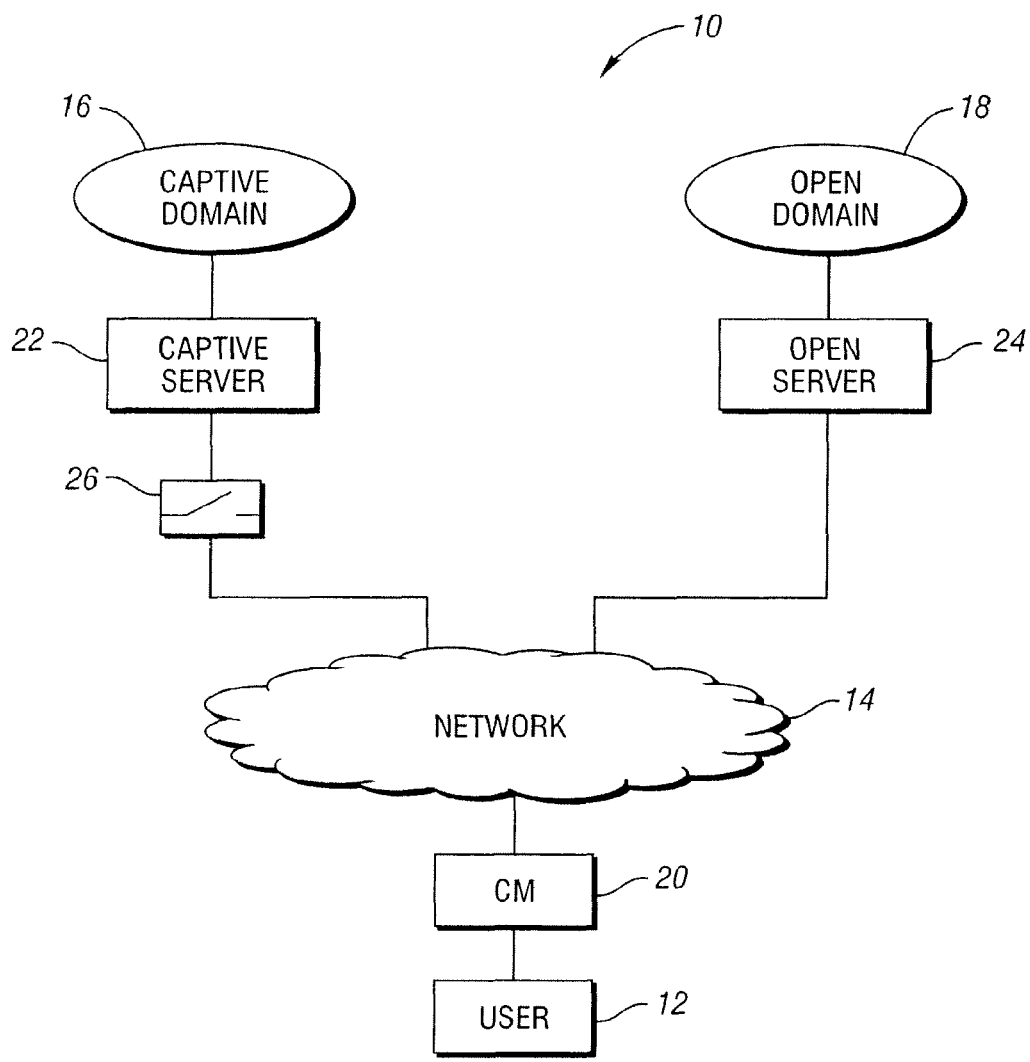

FIG. 3 illustrates the cable modem 20 communicating with the open server 24 instead of the captive server 22. This may occur upon expiration of the renew period and/or in response to a some other reboot, such as in response to the service provider issuing a signal to force an immediate reboot. As noted above and as long as the cable modem 20 receives the changes to its attributes, the reboot forces the cable modem 20 to facilitate communications with the open server 24 instead of the captive server 22 so as to provide access to the open domain 18 and its content. This can be helpful in moving the processing demands from the captive server 22 to the open server 24, freeing the captive server 22 to support captive domain communications with other users.

FIGS. 1-3 describe various aspect of the present invention and restricting user access to content available from one or more of the domains 16, 18. A number of switches 26 are shown to further demonstrate the restrictions. These switches 26 are shown of exemplary purposes and are not intended to reflect the need for actual switches are similar type devices to control access between the element connected thereto, although the present invention does contemplate the use of actual switches if needed in some environments. As such, while there may be physical or wireless connections between the elements connected by the switches 26, the switches 26 are primarily intended to symbolize access between the connected to elements. The switches 26 are shown in an open state to indicate an inability to communicate through the connection associated therewith.

The foregoing arrangement allows the present invention to address various business use cases. One use case may include relegating a customer to a captive portal during the activation process, where the customer is allowed to make service-specific configuration changes. Another use case may include relegating the 5 customer to a captive portal, with a warning page and appropriate corrective or ignore options, when the customer has reached a threshold limit. Some threshold limit examples may include excessive bandwidth usage, excessive downloads/updates, or excessive generation of email/spam. Another use case may include relegating the customer to a captive portal, such as to inform them of missing or delayed payments to the service provider. Still another use case may include relegating the customer to a friendly portal, such as to support enhanced features like birthday greetings, at the request of the customer or in response to a message received from another user in communication with the system. Another use case may include forcing the customer to a captive portal until a corrective action 15 is completed, such as to force the customer to correct an abuse of service, non-payment of bills, etc.

The present invention may be configured such that customers may be provisioned with specific DNS attributes without changing their provisioned service class and with the use of a DNS application controlled via a policy engine to redirect 20 the customers to various portals. The present invention may leverage provisioning flows for modems (Cable or DSL or FTTH modems) and their supported capabilities to redirect the devices behind the modem to a particular DNS domain. This may include the use of various mechanisms to relegate customer traffic, under certain scenarios, to a captive portal. The present invention may operate in a 25 triple-play environment with various devices, such as high speed modems (cable, DSL, or FTTH), VoIP endpoints (MTAs and IADs), video set-top boxes, and wireless handsets (3G and 4G).

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus comprising:
   one or more processors; and
   memory storing instructions that, when executed by the one or more processors, cause the apparatus to:
      permit communications from a user device to a captive domain;
      block communications from the user device to an open domain; and
      subsequent to permitting the communications from the user device to the captive domain, forward new communications from the user device to the open domain after a provisioning attribute, configured to force communications from the user device to the open domain via an open domain device and block communications from the user device to the apparatus, has been sent to the user device.

2. The apparatus of claim 1, wherein the provisioning attribute is configured to force, after an activation of the provisioning attribute, other communications from the user device to the open domain via the open domain device.

3. The apparatus of claim 1, wherein the instructions, when executed by the one or more processors, cause the apparatus to forward the new communications from the user device to the open domain after the provisioning attribute has been sent to the user device and prior to an activation of the provisioning attribute at the user device.

4. The apparatus of claim 1, wherein the instructions, when executed by the one or more processors, cause the apparatus to permit the communications from the user device to the captive domain and block the communications from the user device to the open domain by:
   permitting communications from the user device to access captive content specified by a service provider of the captive domain; and
   blocking communications from the user device to access open content of the open domain independent of the service provider.

5. The apparatus of claim 1,
   wherein the instructions, when executed by the one or more processors, cause the apparatus to permit the communications from the user device to the captive domain and block the communications from the user device to the open domain during an activation process of services sent to the user device; and
   wherein the instructions, when executed by the one or more processors, cause the apparatus to forward the new communications from the user device to the open domain after the activation process of services has been completed.

6. The apparatus of claim 1, wherein the provisioning attribute is configured to activate after the user device has been rebooted.

7. The apparatus of claim 1, wherein the instructions, when executed by the one or more processors, cause the apparatus to, subsequent to a reboot of the user device, force other communications from the user device to the open domain via the open domain device.

8. An apparatus comprising:
   one or more processors; and
   memory storing instructions that, when executed by the one or more processors, cause the apparatus to:
      send, to a captive domain device, a first request for content associated with an open domain;
      after sending of the first request, receive captive content associated with a captive domain instead of the open domain;
      subsequent to the sending the first request and receiving the captive content, receive a provisioning attribute configured to force communications to the open domain via an open domain device and block communications to the captive domain device; and
      subsequent to receiving the provisioning attribute, send, to the captive domain device, a second request for content associated with the open domain.

9. The apparatus of claim 8, wherein the instructions, when executed by the one or more processors, cause the apparatus to:
   after sending the second request for content associated with the open domain, receive, from the captive domain device, open content associated with the open domain.

10. The apparatus of claim 8, wherein the instructions, when executed by the one or more processors, cause the apparatus to:
    subsequent to receiving the provisioning attribute, send, to the captive domain device, new requests to access the open domain.

11. The apparatus of claim 8, wherein the instructions, when executed by the one or more processors, cause the apparatus to:
    activate the provisioning attribute; and
    subsequent to activating the provisioning attribute, force new requests to access the open domain to be sent to the open domain device rather than the captive domain device.

12. The apparatus of claim 8, wherein the instructions, when executed by the one or more processors, cause the apparatus to send, to the captive domain device, the second request for content associated with the open domain prior to activation of the provisioning attribute by the apparatus.

13. The apparatus of claim 8, wherein the instructions, when executed by the one or more processors, cause the apparatus to:

activate after a reboot of the apparatus, the provisioning attribute allowing the apparatus to access the open domain via the open domain device instead of the captive domain device.

14. The apparatus of claim 8, wherein the instructions, when executed by the one or more processors, cause the apparatus to:
prior to receiving the provisioning attribute, execute an activation process for services.

15. The apparatus of claim 8, wherein the provisioning attribute is one of a configuration file, a parameter setting, or an instruction.

16. An apparatus comprising:
one or more processors; and
memory storing instructions that, when executed by the one or more processors, cause the apparatus to:
permit communication from a user device to a captive domain;
block communications from the user device to an open domain;
send, to the user device, a provisioning attribute configured to force communications from the user device to the open domain via an open domain device and block communications from the user device to the apparatus; and
after sending the provisioning attribute, forward new communications from the user device to the open domain.

17. The apparatus of claim 16, wherein the instructions, when executed by the one or more processors, cause the apparatus to:
authorize the user device to access the open domain after an activation process of services at by the user device has been completed.

18. The apparatus of claim 16, wherein the provisioning attribute is configured to prevent the user device from accessing the open domain via the apparatus after activation of the provisioning attribute by the user device.

19. The apparatus of claim 16, wherein the instructions, when executed by the one or more processors, cause the apparatus to permit the user device access to captive content of the captive domain specified by a service provider.

20. The apparatus of claim 16, wherein the provisioning attribute is configured to activate after the user device has been rebooted to force the user device to access the open domain via the open domain device.

21. A system comprising:
a captive domain device, associated with a captive domain, comprising:
one or more processors; and
memory storing instructions that, when executed by the one or more processors, cause the captive domain device to:
permit communications from a user device to the captive domain;
block communications from the user device to an open domain; and
subsequent to permitting the communications from the user device to the captive domain, forward new communications from the user device to the open domain after a provisioning attribute, configured to force communications from the user device to the open domain via an open domain device associated with the open domain and block communications from the user device to the captive domain device, has been sent to the user device; and the user device comprising:
one or more processors; and
memory storing instructions that, when executed by the one or more processors of the user device, cause the user device to:
send, to the captive domain device, at least one communication.

22. The system of claim 21, wherein the instructions of the user device, when executed by the one or more processors of the user device, cause the user device to:
after activating the provisioning attribute, force other new communications from the user device to the open domain to be sent to the open domain device.

23. The system of claim 21, wherein the system is configured to permit the captive domain device to forward the new communications from the user device to the open domain until the user device activates the provisioning attribute.

24. The system of claim 21, wherein the instructions of the captive domain device, when executed by the one or more processors of the captive domain device, further cause the captive domain device to:
during an activation process and prior to sending the provisioning attribute to the user device:
permit communications from the user device to access captive content specified by a service provider of the captive domain; and
block communications from the user device to access open content of the open domain independent of the service provider.

25. The system of claim 24,
wherein the instructions of the captive domain device, when executed by the one or more processors of the captive domain device, cause the captive domain device to permit the communications from the user device to the captive domain and block the communications from the user device to the open domain during an activation process of services sent to the user device; and
wherein the instructions of the captive domain device, when executed by the one or more processors of the captive domain device, cause the captive domain device to forward the new communications from the user device to the open domain after the activation process has been completed.

26. The system of claim 21, wherein the user device comprises a modem, and wherein the instructions of the modem, when executed by the one or more processors of the modem, cause the modem to:
activate the provisioning attribute by rebooting the modem.

27. The system of claim 26, wherein the instructions of the modem, when executed by the one or more processors of the modem, cause the modem to:
subsequent to rebooting the modem, force other communications from the user device to the open domain via the open domain device.

28. A system comprising:
a user device comprising:
one or more processors; and
memory storing instructions that, when executed by the one or more processors, cause the user device to:
send, to a captive domain device associated with a captive domain, a first request for content associated with an open domain;

after sending the first request, receive captive content associated with the captive domain instead of the open domain;

subsequent to sending the first request and receiving the captive content, receive a provisioning attribute configured to force communications to the open domain via an open domain device associated with the open domain and block communications to the captive domain device; and subsequent to receiving the provisioning attribute, send, to the captive domain device, a second request for content associated with the open domain; and the captive domain device, wherein the captive domain device comprises:

one or more processors; and memory storing instructions that, when executed by the one or more processors of the captive domain device, cause the captive domain device to:

prior to sending the provisioning attribute to the user device, block the first request for content associated with the open domain; and subsequent to sending the provisioning attribute to the user device, forward, to the open domain, the second request for content associated with the open domain.

29. The system of claim 28, wherein the instructions of the user device, when executed by the one or more processors of the user device, cause the user device to:

after sending the second request for content associated with the open domain, receive, from the captive domain device, open content associated with the open domain.

30. The system of claim 28, wherein the instructions of the user device, when executed by the one or more processors of the user device, cause the user device to:

subsequent to receiving the provisioning attribute, send, to the captive domain device, new requests to access the open domain.

31. The system of claim 30, wherein the instructions of the user device, when executed by the one or more processors of the user device, cause the user device to:

activate the provisioning attribute; and subsequent to activating the provisioning attribute, force additional new requests to access the open domain to be sent to the open domain device rather than the captive domain device.

32. The system of claim 28, wherein the instructions of the user device, when executed by the one or more processors of the user device, cause the use device to send, to the captive domain device, the second request for content associated with the open domain prior to activation of the provisioning attribute by the user device.

33. The system of claim 28, wherein the instructions of the user device, when executed by the one or more processors of the user device, cause the user device to:

activate after a reboot of the user device, the provisioning attribute allowing the user device to access the open domain via the open domain device instead of the captive domain device.

34. The system of claim 28, wherein the instructions of the user device, when executed by the one or more processors of the user device, cause the user device to:

prior to receiving the provisioning attribute, execute an activation process for services.

35. The system of claim 28, wherein the provisioning attribute is one of a configuration file, a parameter setting, or an instruction.

36. A system comprising:

a captive domain device, associated with a captive domain, comprising:

one or more processors; and memory storing instructions that, when executed by the one or more processors, cause the captive domain device to:

permit communications from a user device to the captive domain;

block communications from the user device to an open domain;

send, to the user device, a provisioning attribute configured to force communications from the user device to the open domain via an open domain device associated with the open domain and block communications from the user device to the captive domain device; and after sending the provisioning attribute, forward communications from the user device to the open domain; and the user device comprising:

one or more processors; and memory storing instructions that, when executed by the one or more processors of the user device, cause the user device to:

send, to the captive domain device, at least one communication.

37. The system of claim 36, wherein the instructions of the captive domain device, when executed by the one or more processors of the captive domain device, cause the captive domain device to:

authorize the user device to access the open domain after an activation process of services at by the user device has been completed.

38. The system of claim 36, wherein the provisioning attribute is configured to prevent the user device from accessing the open domain via the captive domain device after activation of the provisioning attribute by the user device.

39. The system of claim 36, wherein the instructions of the captive domain device, when executed by the one or more processors of the captive domain device, cause the captive domain device to permit the communications from the user device to the captive domain by permitting the user device to access captive content of the captive domain specified by a service provider.

40. The system of claim 36, wherein the user device is a modem and the provisioning attribute is configured to activate, after the modem has been rebooted, to force the modem to access the open domain via the open domain device.

* * * * *

UNITED STATES PATENT AND TRADEMARK OFFICE
CERTIFICATE OF CORRECTION

PATENT NO. : 10,200,299 B2  
APPLICATION NO. : 15/461015  
DATED : February 5, 2019  
INVENTOR(S) : Datla et al.

Page 1 of 1

It is certified that error appears in the above-identified patent and that said Letters Patent is hereby corrected as shown below:

In the Claims

Column 9, Claim 32, Line 49:
Please delete "use" and insert --user--

Signed and Sealed this
Twenty-fifth Day of June, 2019

Andrei Iancu
*Director of the United States Patent and Trademark Office*